United States Patent [19]

Lagacé

[11] Patent Number: 5,076,378
[45] Date of Patent: Dec. 31, 1991

[54] VEHICLE WITH THREE-AXLE WALKING BEAMS SUSPENSION

[76] Inventor: Jean-Hugues Lagacé, 118-A, Grande Ligne Lac Etchemin, Québec, Canada, G0R 1S0

[21] Appl. No.: 567,792

[22] Filed: Aug. 15, 1990

[51] Int. Cl.$^5$ .............................................. B62D 55/00
[52] U.S. Cl. ...................................... 180/9.1; 180/6.7; 280/677; 280/111; 280/681
[58] Field of Search .................. 180/6.2, 6.3, 6.7, 9.1, 180/9.21, 9.26, 9.32, 9.44–9.54, 9.56, 305, 307, 22; 305/15, 21, 23–25, 28, 29, 32, 60; 280/677, 684, 687, 681, 111

[56] References Cited

U.S. PATENT DOCUMENTS

| | | | |
|---|---|---|---|
| 2,536,543 | 11/1951 | Focht | 180/9.1 |
| 2,645,437 | 7/1953 | Bonmartini | 244/103 |
| 2,650,818 | 9/1953 | Martin | 280/681 X |
| 2,735,727 | 2/1956 | Bonmartini | 305/1 |
| 3,151,694 | 10/1964 | Rogers | 180/307 X |
| 3,299,978 | 1/1967 | Sponsler | 180/9.52 |
| 3,471,166 | 10/1969 | Clark | 280/677 |
| 3,494,439 | 2/1970 | Kline | 180/9.48 X |
| 3,659,669 | 5/1972 | Mazzarins | 180/9.5 |
| 4,185,713 | 1/1980 | Williams et al. | 180/307 X |
| 4,207,956 | 7/1980 | McColl | 280/111 X |
| 4,483,407 | 11/1984 | Iwameto et al. | 180/9.5 |
| 4,817,747 | 4/1989 | Kopczynski | 180/22 |

FOREIGN PATENT DOCUMENTS

| | | | |
|---|---|---|---|
| 591113 | 12/1933 | Fed. Rep. of Germany | 305/23 |
| 593618 | 2/1934 | Fed. Rep. of Germany | 180/9.5 |
| 2216307 | 10/1973 | Fed. Rep. of Germany | 180/9.48 |

Primary Examiner—Kenneth R. Rice
Attorney, Agent, or Firm—Pierre Lesperance

[57] ABSTRACT

This invention defines a suspension arrangement for off-highway vehicle that comprises a front pair or walking beams, a rear pair of walking beams, each beam pivoted to the vehicle underframe, articulated joints connecting the rear end of the front beam to the front end of the rear beam to allow up-and-down relative pivoting between the front beams and the rear beams, wheel axles and wheels at the outer end of each beam and at the articulated joints to form a three-axle arrangement, one pair of walking beams being extendible and retractable in length for allowing pivoting of the pairs of walking beams relative to the vehicle chassis, the pivot for one pair of walking beams being preferably positioned higher than the other to accommodate endless tracks of constant length around the wheels on the opposite sides of the vehicle, irrespective of the pivoted positions of the beams, and the transverse pivots for the walking beams have outer end portions projecting a predetermined length from the underframe to carry a corresponding walking beam and a tubular spacer inward or outward of the latter to allow space for a wide endless track or for a narrow endless track producing a wide endless track configuration or a narrow endless track configuration.

7 Claims, 9 Drawing Sheets

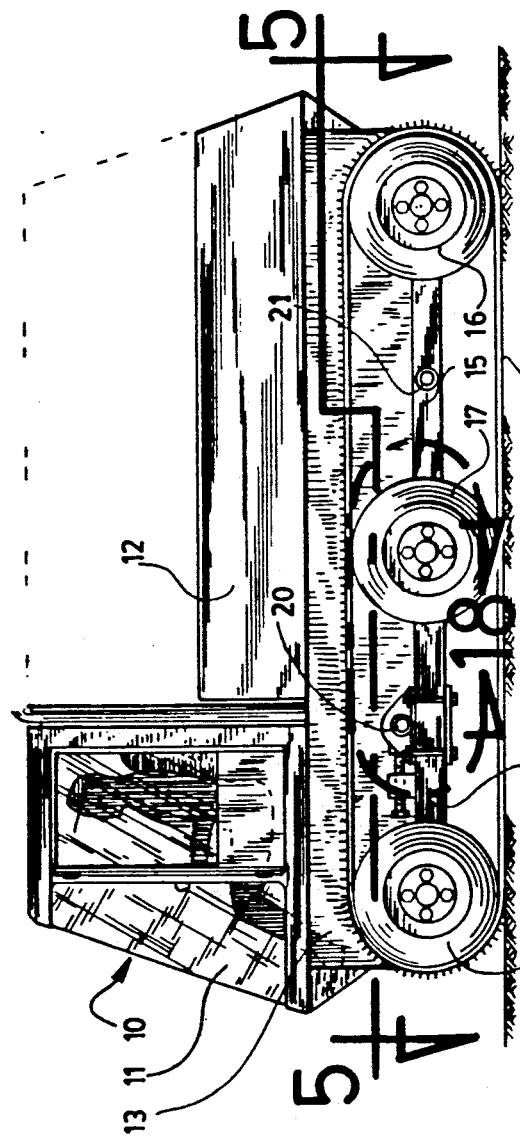
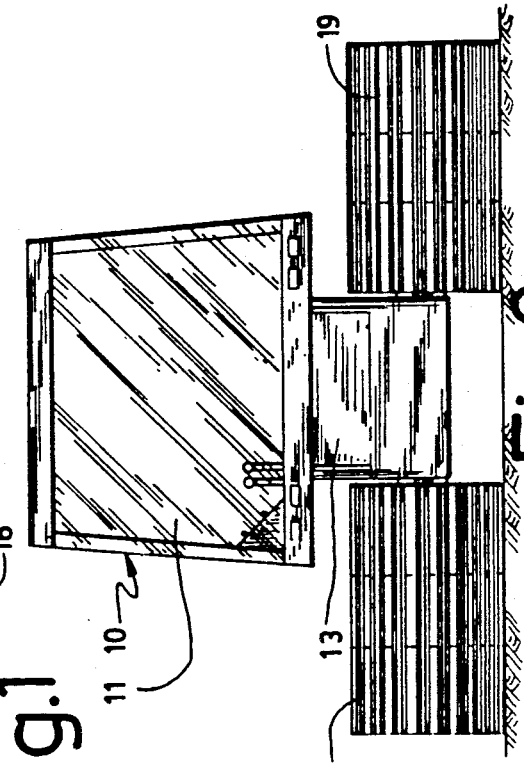
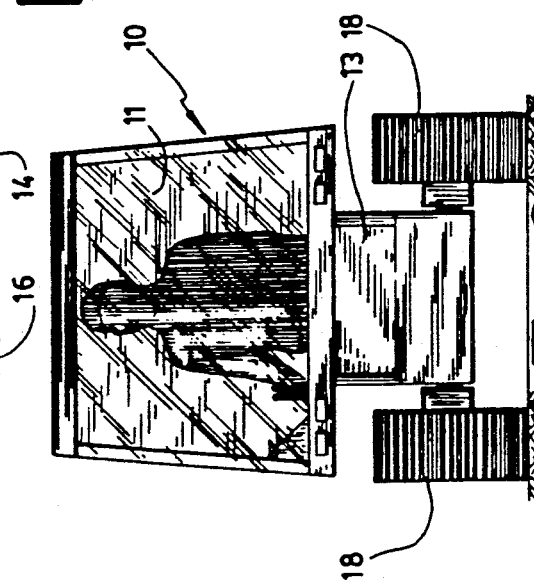

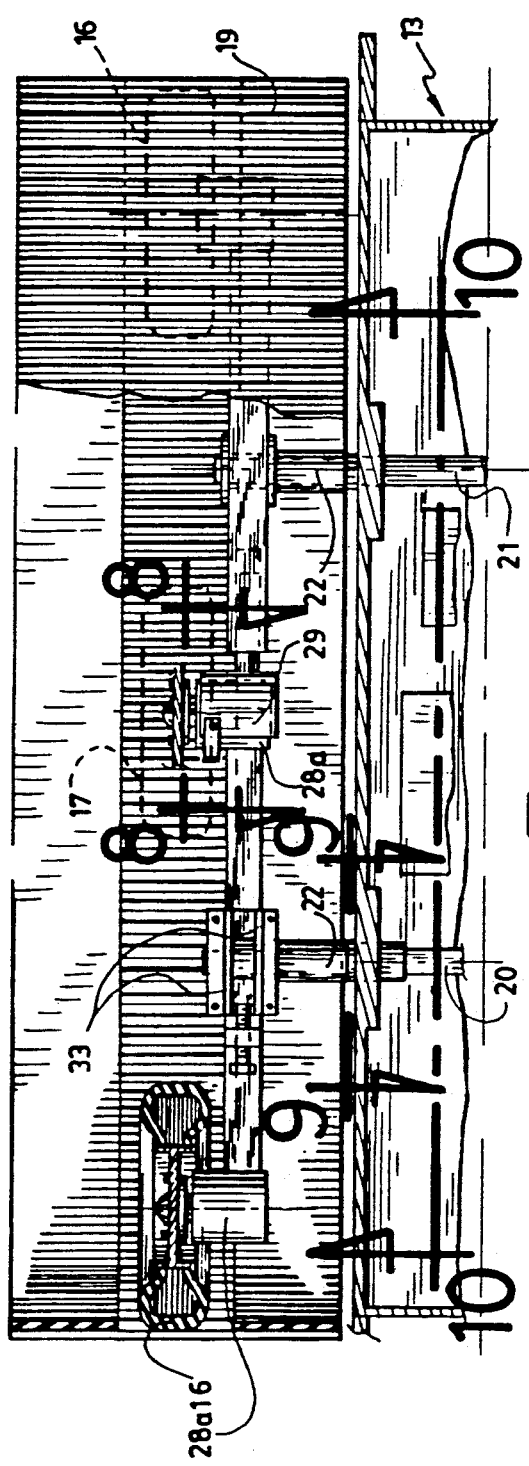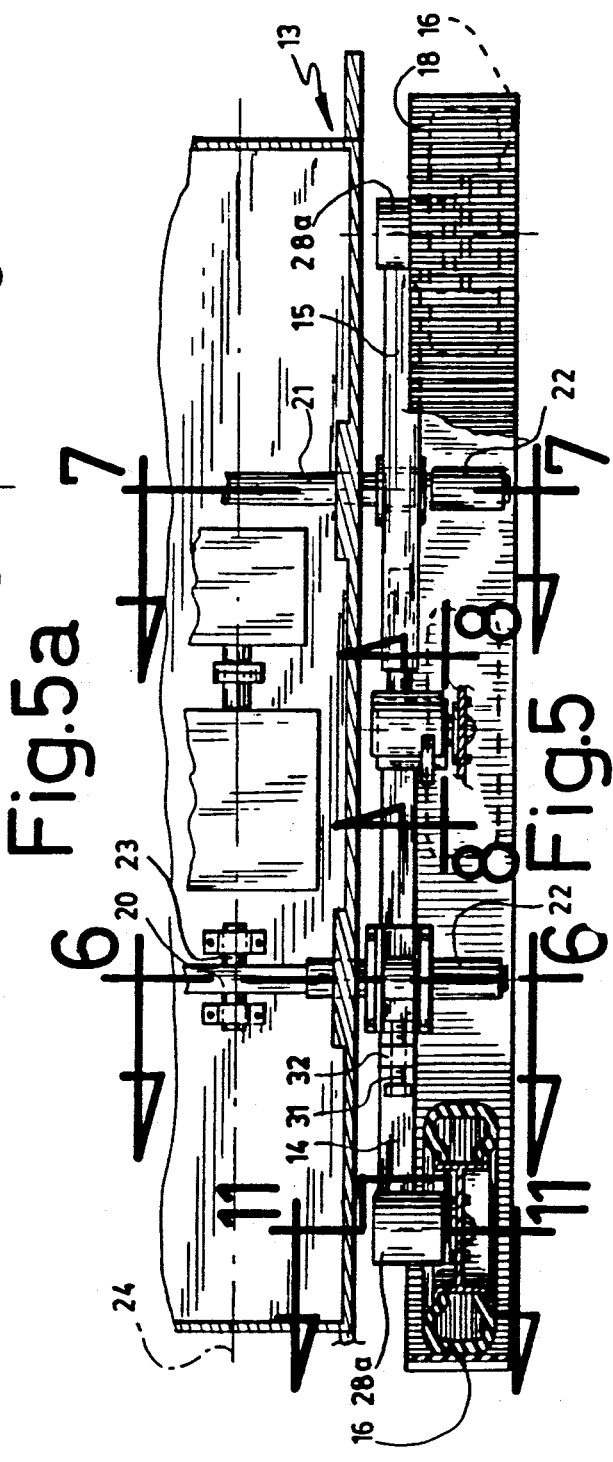
Fig.5a
Fig.5

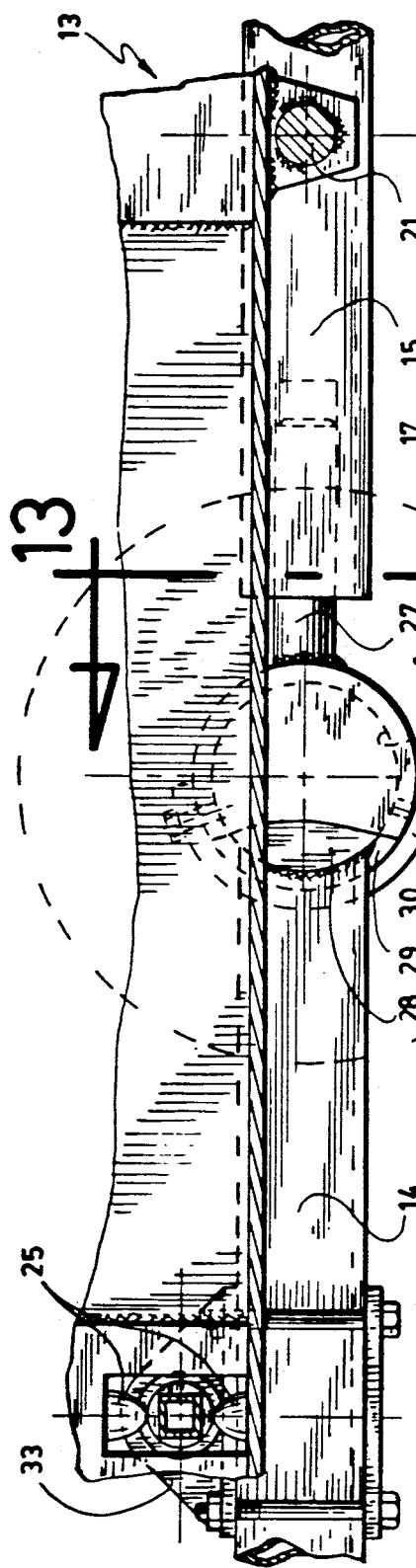
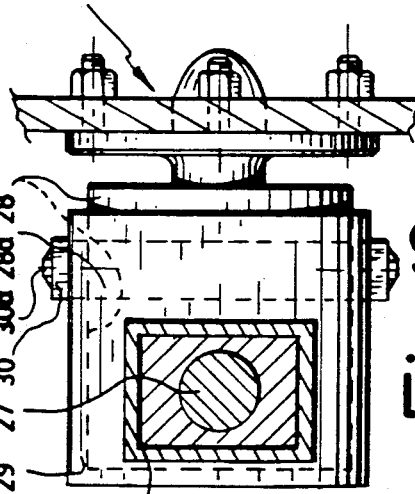
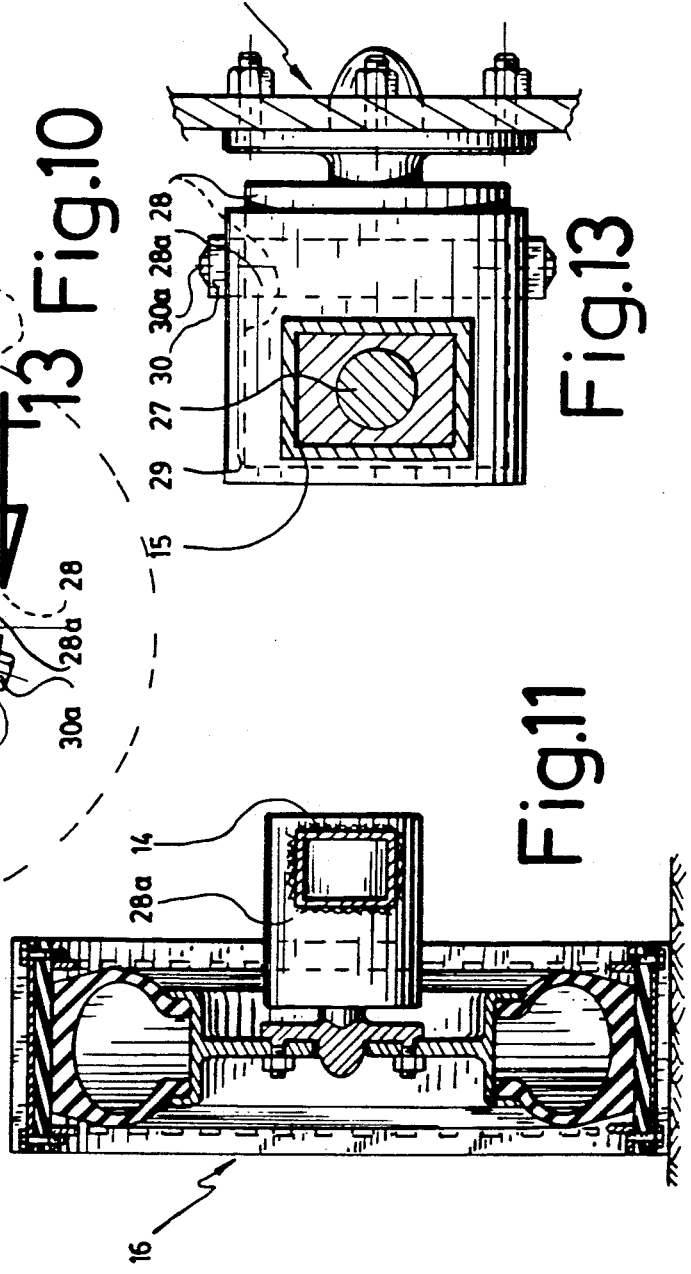

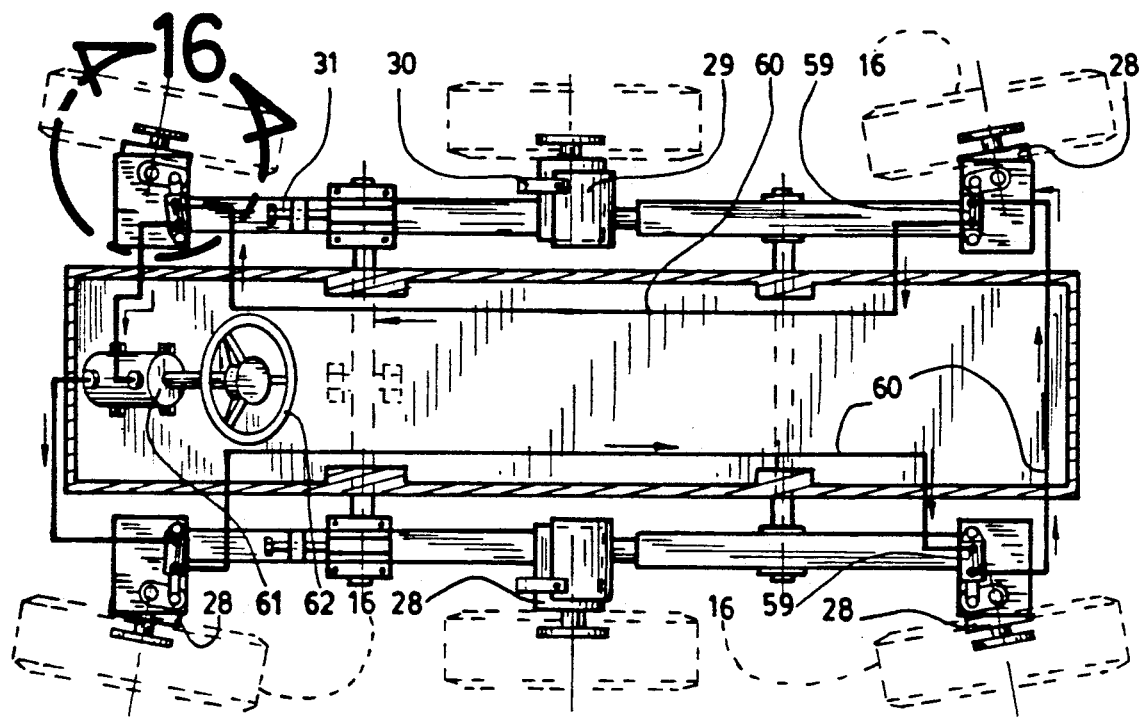
Fig.15
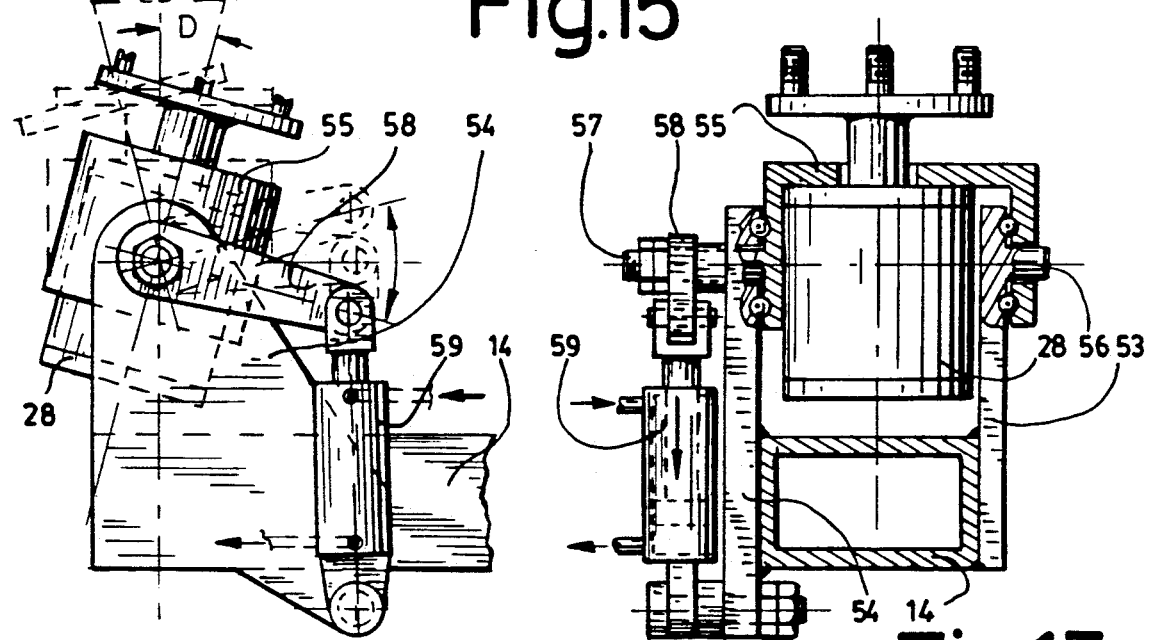
Fig.16
Fig.17

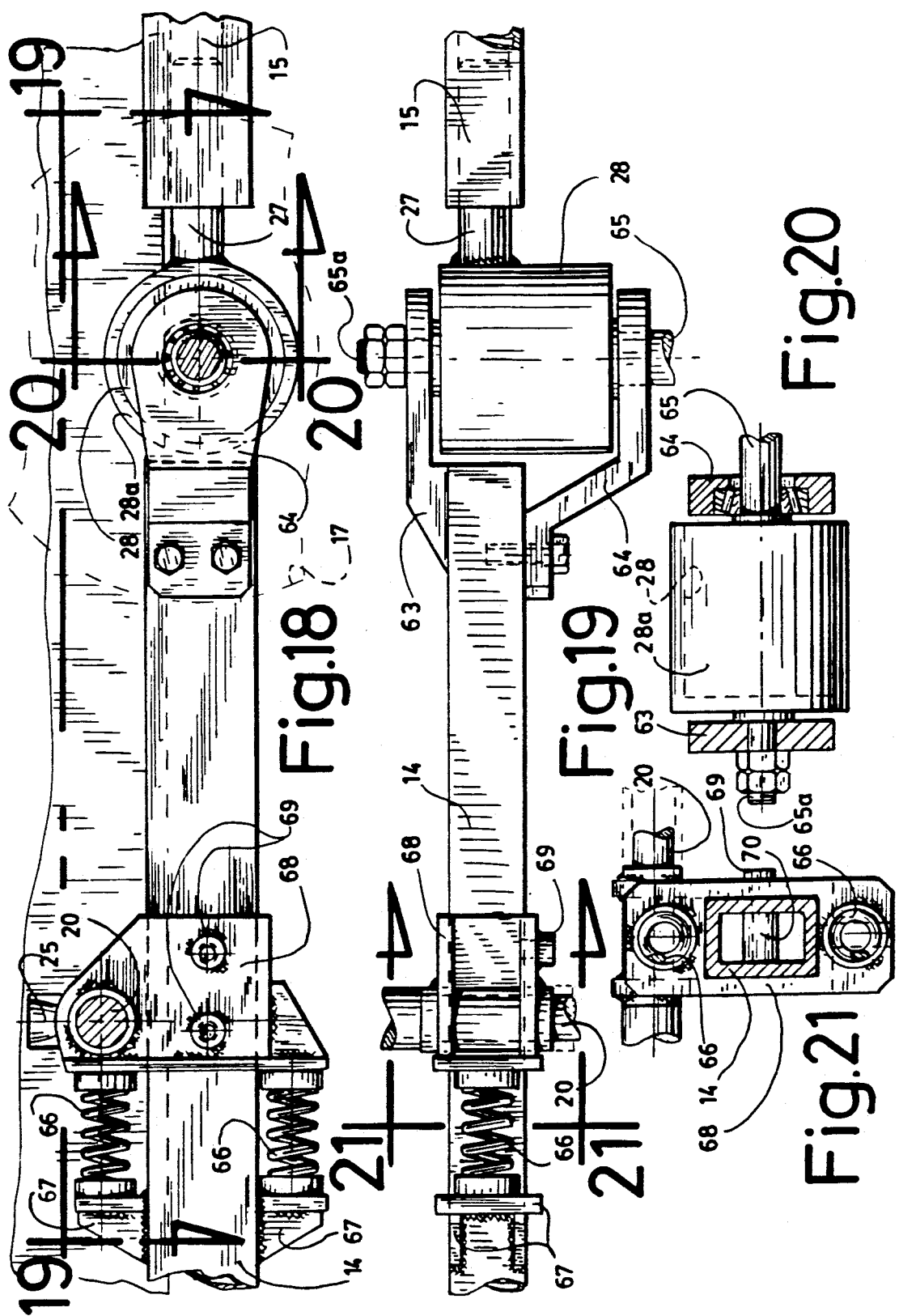

5,076,378

VEHICLE WITH THREE-AXLE WALKING BEAMS SUSPENSION

FIELD OF THE INVENTION

This invention relates to a vehicle primarily conceived for off-highway use but also usable on roads and provided with a suspension of the type including walking beams with a three-axle arrangement.

BACKGROUND OF THE INVENTION

Off-highway vehicles have been conceived with walking beams arranged in pairs, such that each walking beam on one side of the vehicle is paired with another one on the opposite side and a pair of wheel axles and wheels are secured to the opposite ends of each walking beam. Such construction is conventionally used for relatively long and heavy off-highway vehicles to produce the necessary load-bearing capacity with or without the use of endless tracks (see U.S. Pat. No. 3,471,166 to E. G. Clark dated Oct. 7, 1969).

OBJECTS OF THE INVENTION

It is a general object and advantages of the present invention to provide in a off-highway vehicle a suspension arrangement of the above-mentioned type, wherein a front pair of walking beams and a rear pair of walking beams are joined end to end by a pure pivotal joint for positive and pure pivoting of the front beams relative to the rear beams about a transverse axis.

It is another object of the present invention to provide the afore-mentioned articulated joint with a simple and convenient arrangement of the wheel axles particularly at the articulated joint.

It is a further object of the present invetnion to provide such suspension arrangement including the intermediate pure pivotal joint and a simple telescopic arrangement of one pair of walking beams adjacent the articulated joint to allow for extension and contraction of those beams upon up-and-down pivoting of the pairs of walking beams.

It is still another object of the present invention to provide such vehicle and suspension arrangement with relative positioning of the pivots for the walking beams, such that the same endless track length is needed substantially throughout the range of relative up-and-down pivoting of the front and the rear walking beams.

The above and other objects and advantages of the present invention will be better understood with reference to the following detailed description of preferred embodiments thereof, which are illustrated by way of example in the accompanying drawings.

SHORT DESCRIPTION OF THE DRAWINGS

FIG. 1 is a side elevation view of a off-highway tracked vehicle provided with a suspension arrangement according to the present invention;

FIGS. 2 and 2a are front elevation views of the vehicle of FIG. 1 in narrow and large track configurations, respectively;

FIG. 5 is a plan sectional view as seen along line 5—5 in FIG. 1, particularly illustrating the details of the narrow track configuration;

FIG. 5a is a plan sectional view similar to FIG. 5 but showing the other side of the vehicle in the wide track configuration;

Figure 6:
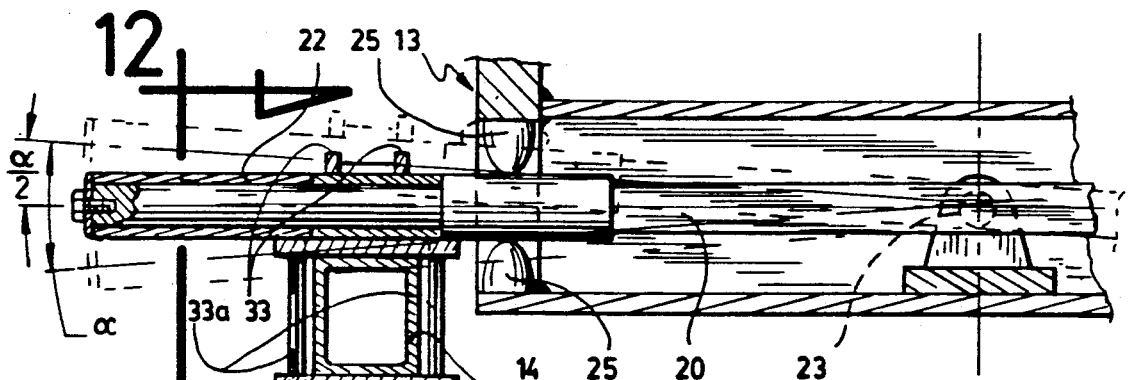
Figure 7:
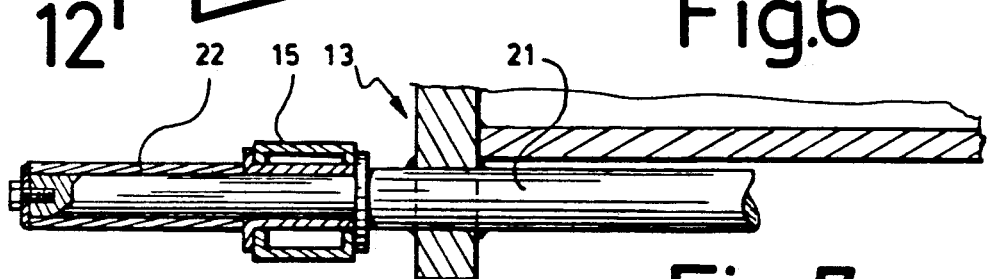
Figure 12:
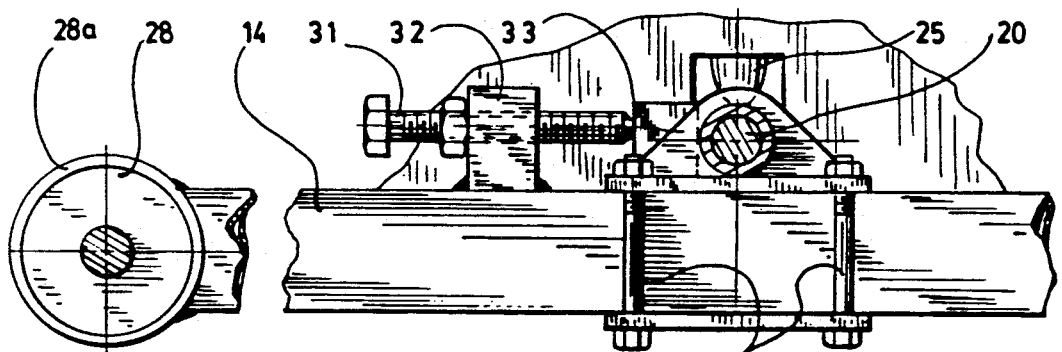
Figure 8:
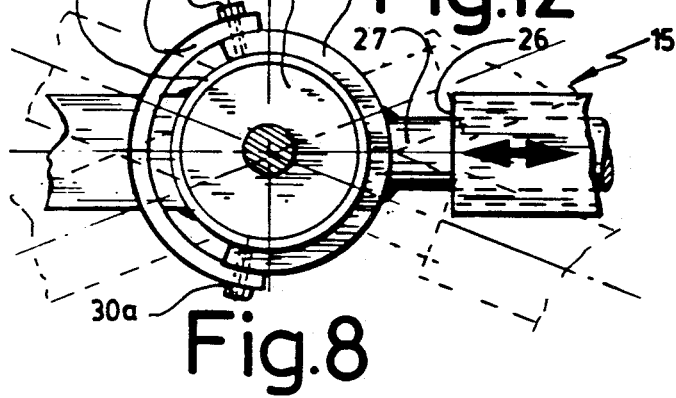
Figure 9:
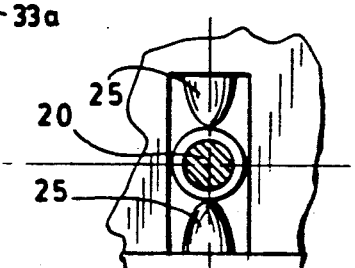
Figure 14:
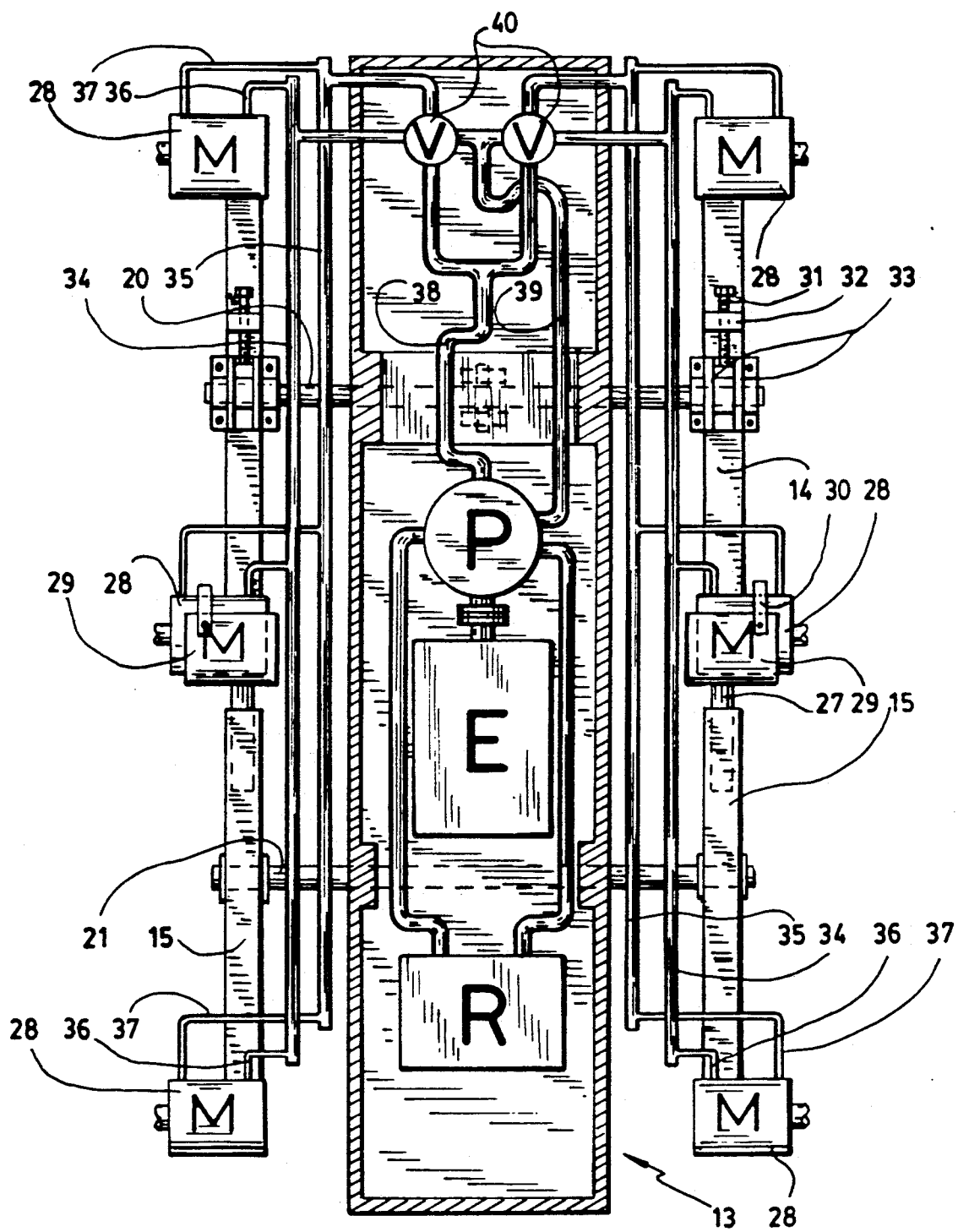
Figure 14A:
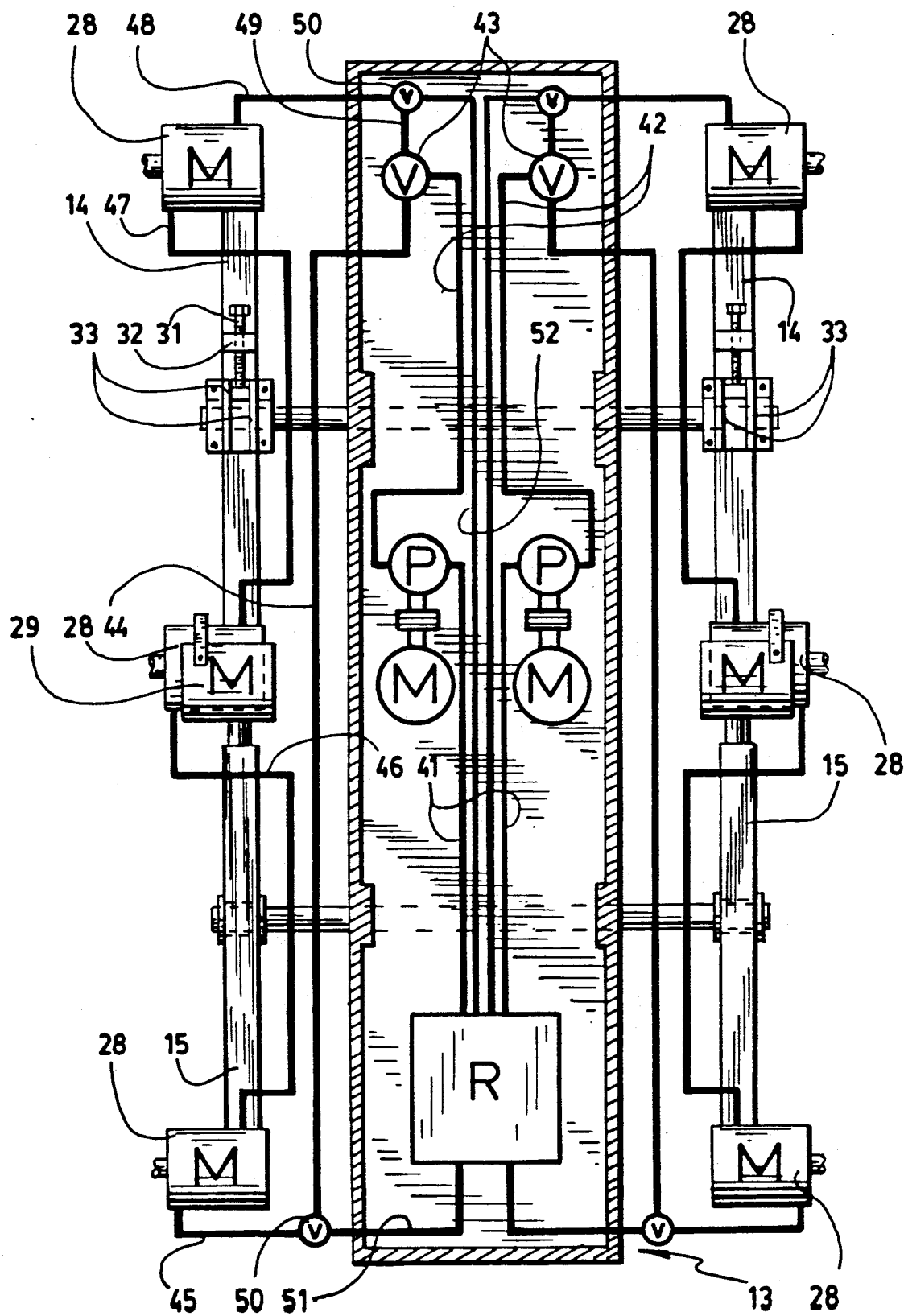

FIGS. 6 and 7 are cross-sectional views taken transversely of the vehicle as seen along lines 6—6 and 7—7, in FIG. 5, particularly illustrating the details of the transverse pivots respectively for the two pairs of walking beams forming part of the invention;

FIG. 8 is a cross-sectional view of a roller and socket joint as seen along line 8—8 in FIGS. 5 and 5a;

FIG. 9 is a cross-sectional view as seen along line 9—9 in FIG. 5a showing shock absorbers for a transverse pivot axle for a pair of walking beams;

FIG. 10 is a cross-section as seen along line 10—10 in FIG. 5a illustrating the walking beams, their pivots and an articulated roller and socket joint between them;

FIG. 11 is a cross-sectional view as seen along line 11—11 in FIG. 5 showing a hydraulic motor connected to a ground support wheel;

FIG. 12 is a cross-sectional view as seen along line 12—12 in FIG. 6 particularly illustrating a track tension adjustment;

FIG. 13 is a cross-sectional view as seen along line 13—13 in FIG. 10 and illustrating the roller and socket joint;

FIGS. 14 and 14a are plan views illustrating hydraulic motors to drive ground support wheels respectively and a hydraulic circuit system to drive the vehicle;

FIG. 15 is a plan view illustrating hydraulic motors and a steering system associated with steerable ground engaging wheels;

FIG. 16 is an enlarged detail view of the assembly encircled by the arrow 16 in FIG. 15;

FIG. 17 is a side view as seen from the right in FIG. 16;

FIG. 18 is a view similar to the view of FIG. 10 but showing a different embodiment of an articulated joint and an endless track tensioning assembly;

FIG. 19 is a top, plan, partial view as seen along line 19—19 in FIG. 18;

FIG. 20 is a cross-section as seen along line 20—20 in FIG. 18; and

FIG. 21 is a cross-sectional view as seen along line 21—21 in FIG. 19.

DETAILED DESCRIPTION OF PREFERRED EMBODIMENTS

The illustrated off-highway vehicle 10 includes a cabin 11 for the operator and a box 12 each being of an conventional construction and being carried on an underframe or frame 13. The latter may be also of any appropriate construction such as a box-like rigid structure.

The concept of the present invention particularly resides in the suspension for the off-highway vehicle. The illustrated suspension includes a front pair of walking beams 14 and a rear pair of walking beams 15 with the walking beams of each pair being positioned on the opposite sides respectively of the underframe 13. Ground support wheels 16 and 17 carry the ends of the walking beams 14 and 15 and selectively supporting an endless track 18 or 19 on each side of the vehicle. In one configuration according to the present invention, the endless tracks 18 are relatively narrow, as shown in FIGS. 1 and 2. In another configuration according to the present invention, the endless tracks 19 are relatively wide, as shown in FIG. 2a.

The pairs of walking beams 14, 15 are pivoted intermediate their ends on the opposite ends of transverse pivots 20 and 21, respectively. The transverse pivots 20 and 21 are secured to the underframe at longitudinally spaced-apart and fixed positions. Each pivot extends through the underframe and has opposite outer end portions on which the corresponding walking beams are pivotally mounted. Each outer end portion of the pivots 20, 21 laterally projects from the underframe a predetermined length to pivotally carry a walking beam 14 or 15 and a tubular spacer 22. A narrow endless track configuration is provided, as shown in FIG. 5, by placing the tubular spacers 22 laterally outward of the walking beams 14 and 15 on the corresponding outer end portions of the pivots 20 and 21. A wide endless track configuration is produced, as shown in FIG. 5a, by engaging the tubular spacers 22 laterally inward of the walking beams 14 and 15. As best shown in FIGS. 5 and 6, the front transverse pivot 20 is transversely pivoted inside the underframe on a pivot 23 axially extending in alignment with the central longitudinal axis 24 of the vehicle. A pair of shock absorbers 25 are mounted on each side of the underframe to laterally stabilize the transversely-pivotable pivot 20 for the front walking beams 14.

Figure 3:
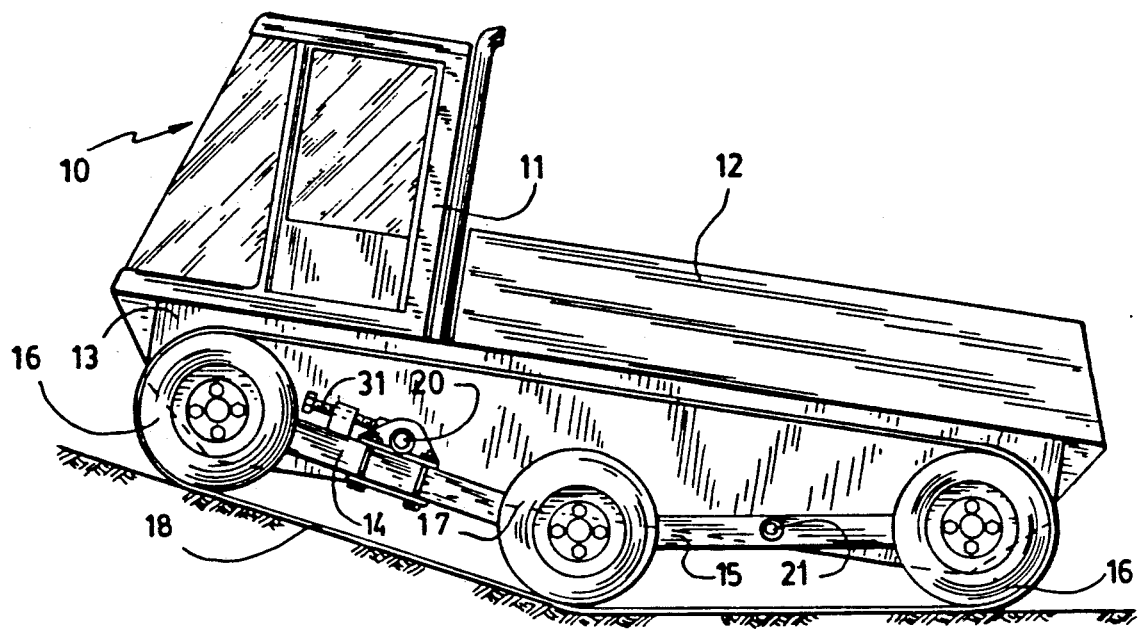
FIGS. 3 and 4 are side views as in FIG. 1 but illustrating the action of the suspension over two different terrain conditions, respectively.
Figure 4:
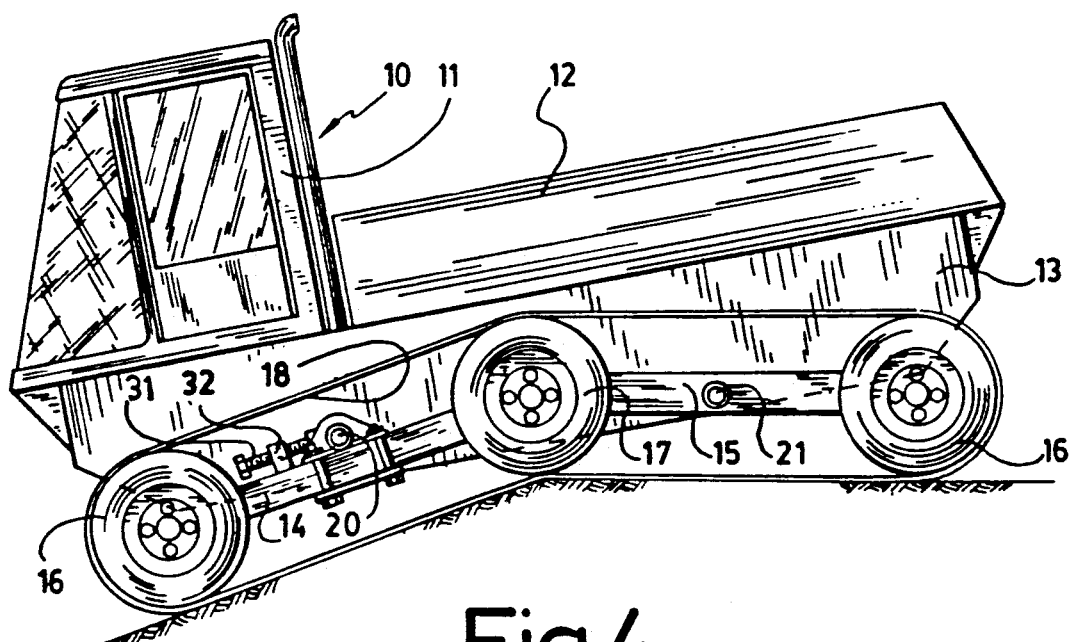

It must be noted that the front transverse pivot 20 is positioned above the plane defined by the axes of the wheels attached to the corresponding walking beams 14, while the rear transverse pivot 21 extends in the plane defined by the axis of the wheels attached to the corresponding walking beams 15, as can that the endless tracks 18 and 19 remain under substantially constant traction when laid around the ground support wheels 16 and 17 irrespective of the relative up-and-down positions of the latter that is caused by pivoting of the walking beams in reaction to various track ground-engaging conditions, two such conditions being shown in FIGS. 3 and 4.

Each walking beam 14 is of one-piece tubular construction. Each walking beam 15 includes a main portion having a tubular construction with an open end 26 positioned forwardly of its pivot 21 in the longitudinal direction of the vehicle.

A casing 28a within which a hydraulic motor 28 is releasably secured, is fixedly mounted on the outer end of each walking beam 14 and 15 and on the inner end of the beam 14. The central shaft of each hydraulic motor 28 laterally projects outward and forms a wheel axle on which is mounted in conventional manner a ground support wheel 16 or 17. The cylindrical casings 28a of the hydraulic motors 28 on the inner end of the walking beams 14 are each rotatably mounted in a partly tubular shape socket 29 and an arc-shaped strap 30 securely retains these motor casings 28a in their sockets. Strap 30 is releasably secured to socket 29 by bolts 30a. Socket 29 is welded to a joint part 27 while casing 28a is welded to beam 14. Joint part 27 telescopically fits within the open end of tubular walking beam 15. There is produced a pivotal and extensible joint defined by two joint sections (motor casing 28 and socket 29, together with the joint part 27 fixed to one joint section). This joint positively interconnects the two beams 14, 15, while allowing pivoting thereof in opposite directions, as shown in FIGS. 3 and 4 and by the dashed lines in FIG. 8. Thus, a very sturdy and simple articulated joint of the interconnected beams is achieved.

On each walking beam 14, an adjustment screw 31 (FIGS. 3, 4 and 12) is screwed in a threaded block 32 fixedly secured on the corresponding beam and it abuts against a bracket 33 rotatively mounted on the pivot 20 and slidably carrying the corresponding beam 14 when bolts 33a of bracket 33 are untightened. The adjustment of the screws 31 produces either outward or inward sliding of the beams 14 endwise in the bracket 33. Once the tautness of the endless track 18 or 19 has been adjusted the bolts 33a are tightened. This adjustment 31-32 is normally used when changing tracks and when a given track has become elongated with long use.

FIG. 14 illustrates a hydraulic system to actuate the hydraulic motors 28 according to one embodiment conceived for the present invention. This hydraulic system includes a hydraulic fluid reservoir R, a central pump p, and an internal combustion engine E to operatively drive the pump. The hydraulic system includes a pair of hydraulic circuits for the opposite sides respectively of the vehicle. The hydraulic circuit on each side of the vehicle includes a pair of feed and return lines 34 and 35 having the hydraulic motors 28 of the corresponding side connected in parallel thereto by secondary lines 36 and 37. A pair of pump outlet pipes 38 and 39 are connected to the lines 34 and 35 on both sides of the vehicle through a pair of valves 40. These valves control the direction of flow of the hydraulic fluid in the lines 34 and 35. The flow in one line 34 or 35 and the return through the other produces rotation of the motors in one direction. The flow in the other direction through the lines 34 and 35 produces opposite rotation of the motors. By proper control of the valve 40, forward and reverse movements of the vehicle may be produced as well as steering of the vehicle with differential flow in one hydraulic circuit on one side relative to the other side. Obviously a modification of the circuit of FIG. 14 can be provided in which the pump p is a variable flow and reversible pump, while the hydraulic motors 28 are still connected in parallel.

FIG. 14a shows a different embodiment of a hydraulic system using a single reservoir R and a pair of hydraulic circuits in a different arrangement. In the hydraulic system of FIG. 14a, there are also provided a pair of hydraulic circuits for the opposite sides respectively of the vehicle. Each hydraulic circuit includes a motor M driving a hydraulic variable flow pump P, an inlet line or pipe 41 joining each pump P to the reservoir R and an outlet 42 connecting the pump 8 to a two-way valve 43. Motors M driving pumps p are usually a single external combustion engine driving the two hydraulic pumps. The hydraulic circuit on each side of the vehicle includes a circuit connecting the hydraulic motors 28 in series. This circuit includes lines 44 to 49 inclusive connecting the motors 28 in series with the corresponding valve 43. A pair of two-way valves 50 are provided between the lines 44, 45, and 48, 49, respectively, and they are connected by the lines 51 and 52 to the reservoir. The valves 43 control the direction of flow in the hydraulic motors 28 and the valves 50 causes the flows to return to the reservoir depending on the direction of flow. Modifications of the circuit of FIG. 14a can be provided using separate hydraulic circuits one for each side of the vehicle and using hydraulic pumps p which are variable flow and reversible pumps. In one system, the motors 28 are serially connected as in FIG. 14a while in the other system the motors 28 are parallel connected as in FIG. 14.

The vehicle illustrated in FIGS. 15, 16, and 17 defines an embodiment of the present invention in wheeled vehicle concept. In this embodiment, the walking beams 14 and 15, the roller and socket joint 28, 29, 30 and the adjustment screws 31 remain constructed and arranged, as aforedescribed. This wheeled vehicle concept is characterized by having the hydraulic motors 28 being pivotally mounted with a system to steer this vehicle. The outer end of each walking beam 14 and 15 is provided with a pair of brackets 53 and 54 fixed against the bottom and top of the corresponding beam and laterally projecting from it. The hydraulic motor 28 is fixed in a housing 55 which is pivoted between the corresponding brackets 53 and 54 about a steering axis defined by a pivot 56 downwardly projecting from the bracket 53 and by a pivot 57 upwardly projecting from the housing 55. A steering arm 58 is fixed to the pivot 57 to rotate the housing 55 and the motor 28 about the steering axis. A hydraulic actuator 59 is connected to each arm 58 to pivot the latter. Hydraulic lines 60 serially connect the four individual hydraulic actuators 59 with a main hydraulic actuator 61 which is operated by rotation of the steering wheel 62. Hydraulic actuator 61 is preferably the one described in my co-pending patent application Ser. No. 07/512,802, dated Apr. 25, 1990 and entitled "Motion Converting Device". As shown by the arrows in FIG. 15, when the steering wheel 62 is rotated in one direction, a flow of hydraulic fluid in one direction is produced by the main actuator 61 and the actuators 59 are all simultaneously actuated to steer all the wheels 16 in the directions required to steer the vehicle in the direction corresponding to the direction of rotation of the steering wheel. Obviously the vehicle of FIGS. 15, 16 and 17 with front and back steering wheels 16 will produce less friction on the ground than the vehicle of FIG. 1 when used without tracks 18 or 19.

The vehicles of FIG. 1, when trackless, can be used on rough ground such as a forest trail. The vehicle of FIG. 15 can be used on more dammageable ground such as on a golf course.

The vehicle of FIG. 1 when provided with tracks can be used on snow such as on a ski slope. The vehicle of FIG. 15 can also be fitted with endless tracks 18 or 19 by locking brackets 53, 54 so as to maintain all the wheel axles parallel and by steering in the same way as the vehicle of FIG. 1, namely by braking the wheels on the inside of the turn.

FIGS. 18 to 21 inclusive illustrate another embodiment of articulated joint between the front and the rear walking beams 14 and 15 and associated with an automatic track-tensioning system replacing the aforedescribed adjustment screw 31. This articulated joint includes a pair of bracket 63 and 64 fixed against the opposide sides of the inner end portion of each front walking beam 14 and cooperatively forming a fork arrangement. A casing 28a for a hydraulic motor 28 is fixedly secured at the inner end of each walking beam 15. The motor 28, which is fixed within casing 28a, has a central axle 65 pivotally carried by the bracket 64. Casing 28a carries a pivot stem 65a, coaxial with axle 65 and pivoted in bracket 63. The axle 65 also forms the wheel axle for a corresponding ground support wheel 17. The automatic track tensioning system on each beam 14, as shown in FIGS. 18, 19, and 21, includes a pair of springs 66 extending under and over the corresponding beam and compressed between fixed abutment brackets 67, and a bracket 68 which is pivotable on the pivot 20. The beams 14 are slidable in the corresponding brackets 68 and are thus outwardly biased endwise by the springs 66 to constantly tension the endless tracks 18 and 19 engaged around the wheels 16 and 17.

When the endless tracks 18 or 19 are not used, for instance in summer, the beam 14 is locked to bracket 68 against the bias of springs 66, by inserting pins (not shown) through holes 69 in bracket 68 and through registering nipples 70 fixed within and transversely of beam 14 and opening at its side faces.

I claim:

1. In a vehicle, the combination comprising an underframe, a pair of front walking beams and a pair of rear walking beams extending in the fore-and-aft direction of the vehicle, the walking beams of each pair located one on each side of the vehicle, each walking beam having an outer end and an inner end, the walking beams of each pair being independently pivotably mounted intermediate said ends to said underframe about a common transverse pivot axis, the pivot axes of the two pairs of walking beams being spaced from each other in the fore-and-aft direction of said vehicle, a pivotal and extensible joint interconnecting the inner ends of the front and rear walking beams on each side of the underframe, whereby the front and rear walking beams on any one side can pivot in opposite directions about their respective pivot axes, a wheel axle carried by each joint and by the outer end of each walking beam, and a support wheel carried by each wheel axle, there being provided a group of three support wheels on each side of the vehicle, and wherein the pivot axis of at least one pair of walking beams is positioned above a straight line joining the wheel axles at the outer end and at the joint of each walking beam of said one pair.

2. In a vehicle as defined in claim 1, further including two endless tracks, each trained on one of said groups of three support wheels.

3. In a vehicle as defined in claim 2, further including shifting means to longitudinally shift the walking beams of at least one pair relative to said respective common pivot axis, said shifting means including a bracket pivotably carried by said underframe for movement about said respective common pivot axis, one on each side of the vehicle, the walking beams of said one pair longitudinally slidably carried by said brackets; an adjustable stop means carried by the walking beams of said one pair and engaging said brackets to maintain said walking beams of said one pair in adjusted position against the bias of the endless tracks.

4. In a vehicle as defined in claim 3, further including a transverse pivot axle extending from one side to the other side of said underframe and pivoted thereto at the mid-section of said transverse pivot axle or movement about a pivot axis directed longitudinally of said underframe, and stop means carried by said underframe to restrict the tilting movement of said transverse pivot axle with respect to said underframe, said transverse pivot axle defining the common transverse pivot axis of said pair of front walking beams.

5. In a vehicle as defined in claim 1, wherein each pivotal joint has a pivot axis which is co-axial with the axis of the wheel axle carried at said joint and said joint has two mutually-pivoted sections, one section having a part which telescopically engages the inner end of one of said front and rear beams, while the inner end of the other of said front and rear beams is directly fixed to the other of said joint sections.

6. In a vehicle as defined in claim 5, further including a driving motor for each wheel, each motor having a casing and a driving shaft, said shaft constituting a wheel axle and said casing directly fixed all of to the outer ends of said walking beams and to one of said joint sections.

7. In a vehicle, the combination comprising an underframe, a pair of front walking beams and a pair of rear walking beams extending in the fore-and-aft direction of the vehicle, the walking beams of each pair located one on each side of the vehicle, each walking beam having an outer end and an inner end, the walking beams of each pair being independently pivotably mounted intermediate said ends to said underframe about a common transverse pivot axis, the pivot axes of the two pairs of walking beams being spaced from each other in the fore-and-aft direction of said vehicle, a pivotal and extensible joint interconnecting the inner ends of the front and rear walking beams on each side of the underframe, whereby the front and rear walking beams on any one side can pivot in opposite directions about said respective pivot axes, a wheel axle carried by each joint and by the outer end of each walking beam, and a support wheel carried by each wheel axle, there being provided a group of three support wheels on each side of the vehicle, two endless tracks each trained on one of said groups of three support wheels and shifting means to longitudinally shift the walking beams of at least one pair relative to said respective common pivot axis, said shifting means including a pair of brackets pivotable about said respective common pivot axis, one of each side of said vehicle, the walking beams of said one pair longitudinally, slidably carried by said brackets and spring means engaging the walking beams of said one pair to constantly bias the same in the direction of the outer ends of the walking beams of said one pair.

* * * * *